Nov. 20, 1923. 1,474,365
I. HUPP
COMBINED CLUTCH AND BRAKE MECHANISM
Filed Aug. 6, 1921 2 Sheets-Sheet 1
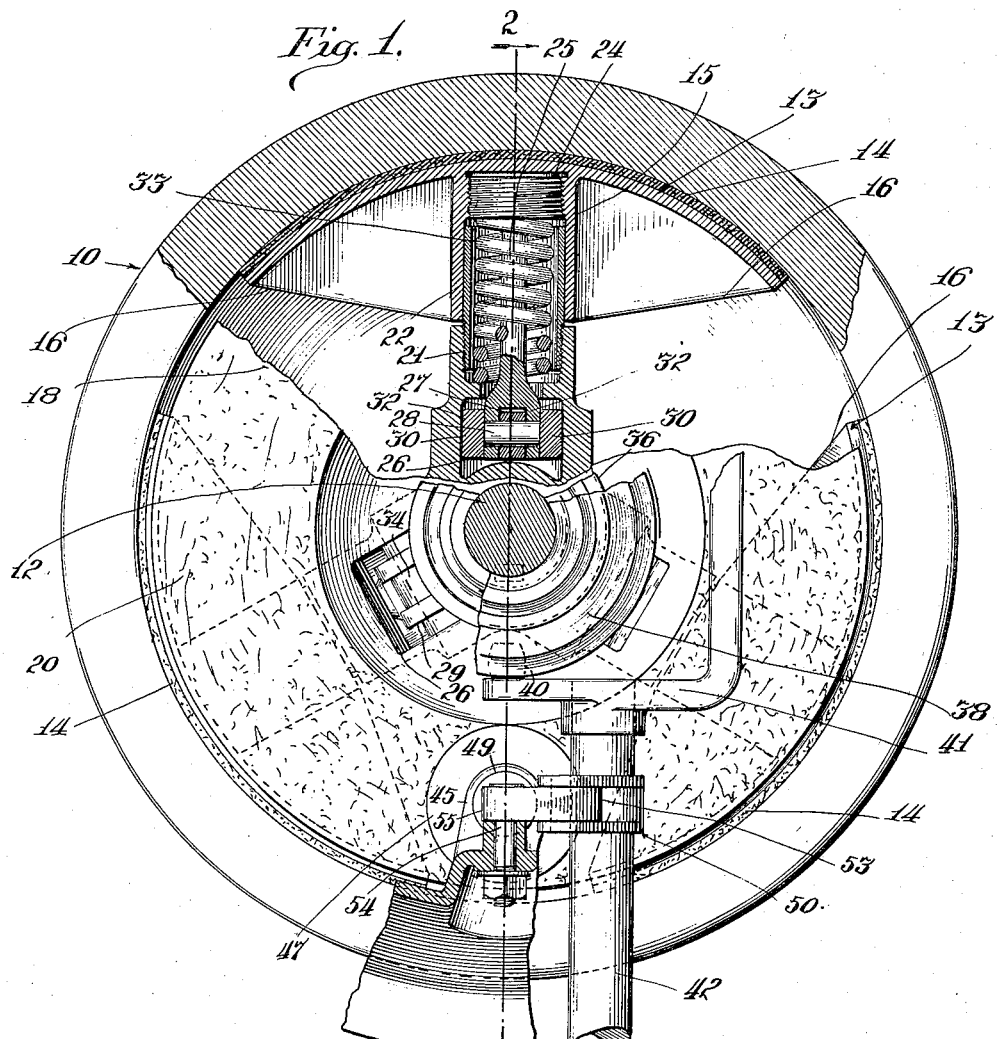

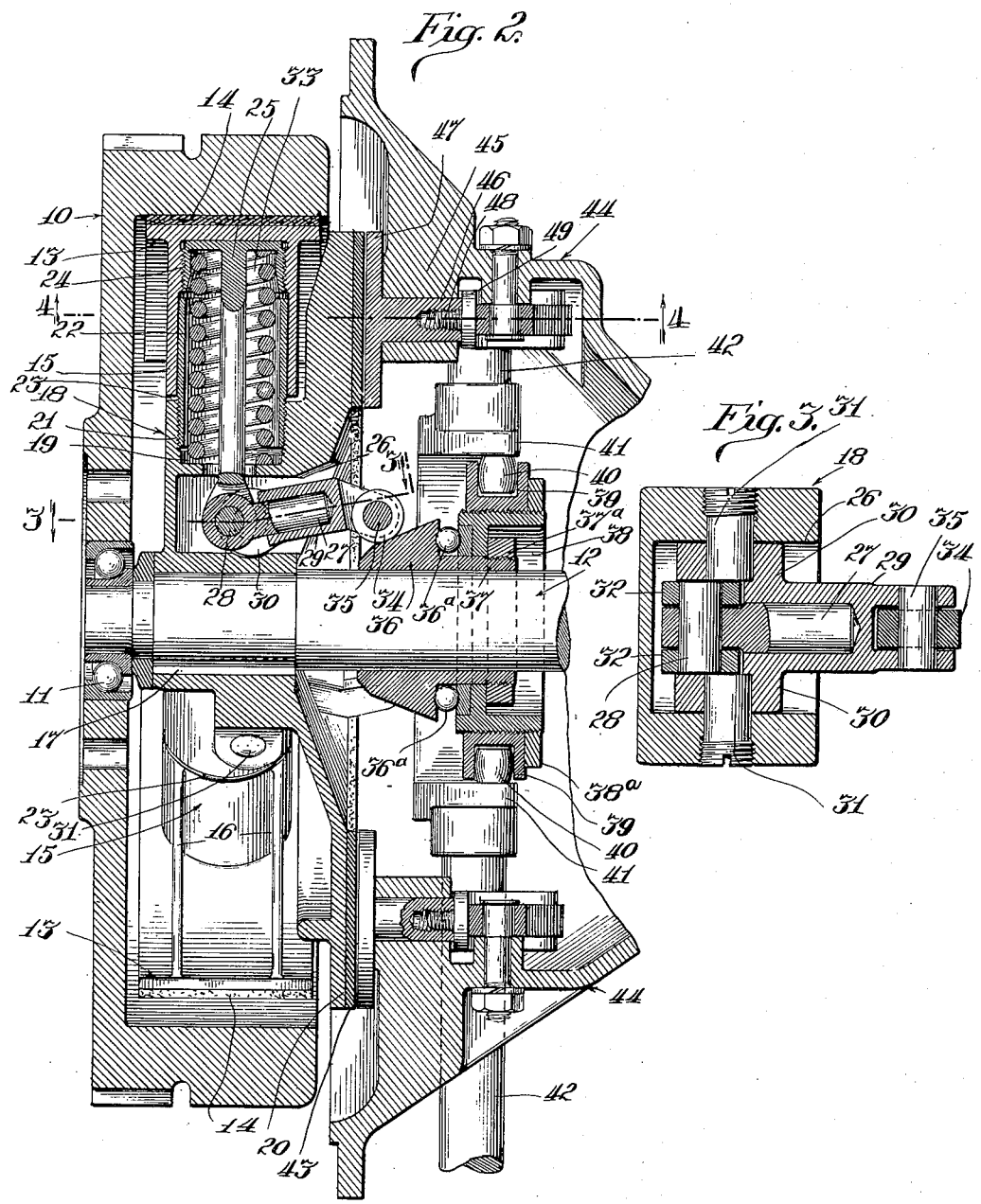

Patented Nov. 20, 1923.

1,474,365

UNITED STATES PATENT OFFICE.

IRVIN HUPP, OF CHICAGO, ILLINOIS, ASSIGNOR TO FLEXO-MOTIVE CORPORATION, OF CHICAGO, ILLINOIS, A CORPORATION OF DELAWARE.

COMBINED CLUTCH AND BRAKE MECHANISM.

Application filed August 6, 1921. Serial No. 490,216.

*To all whom it may concern:*

Be it known that I, IRVIN HUPP, a citizen of the United States, and a resident of Chicago, in the county of Cook and State of Illinois, have invented certain new and useful Improvements in Combined Clutch and Brake Mechanism, of which the following is a description, reference being had to the accompanying drawings, which form a part of my specification.

My invention relates to a clutch and brake mechanism more especially intended for use on motor driven vehicles whereby the engine or power shaft may be operatively connected with the driving shaft of the vehicle and more particularly the driving or power-imparting shaft of the transmission mechanism which is usually disposed intermediate of the clutch mechanism and the differential mechanism whereby the power is properly transmitted to the rear wheels of the vehicle.

The object of my invention is to provide controllable mechanism whereby the driven shaft is preferably frictionally connected with the fly-wheel, secured to the engine shaft, through the medium of suitable springs, in conjunction with mechanism whereby the frictional contact induced by the action of the springs may be under the control of the operator and said frictional relation entirely disrupted when desired through the actuation of common means whereby the brake portion of the mechanism may also be actuated and applied to a member secured to the driven member or shaft, namely the drive shaft of the transmission, when said means is given movement beyond a predetermined degree; that is to say, movement of said common means is first adapted to affect the clutch portion of the mechanism and then affect the brake portion of said mechanism.

A further object of my invention contemplates a construction wherein the degree of movement necessary for actuating the respective elements may be easily controlled and the extent of brake application therefore readily regulated.

The objects of my invention and its advantages will all be readily comprehended from the detailed description of the accompanying drawings, wherein:—

Figure 1 illustrates my combined clutch and brake mechanism in side elevation, with portions broken away and shown in section.

Figure 2 is a vertical sectional view taken substantially on the line 2—2 of Figure 1.

Figure 3 is a detail sectional view taken on the line 3—3 of Figure 2 looking in the direction of the arrows.

Figure 4 is a detail sectional view taken on the line 4—4 of Figure 2 looking in the direction of the arrows.

My invention, as exemplified in the drawings, consists in providing clutch mechanism located within the fly-wheel 10 which is suitably bolted or otherwise secured to the engine-shaft; the fly-wheel being shown provided with suitable anti-friction bearings, as at 11, to receive the end of the driven shaft 12, namely the shaft which constitutes the drive-shaft of the transmission which in motor driven vehicles is usually located intermediate of the clutch mechanism and the differential mechanism. The fly-wheel 10 is formed with the periphery or rim disposed toward one side of the radial portion or spokes so as to receive a plurality of segmental shoes or members 13; three similar segmental shoes 13 being shown in Figure 1, disposed at equi-distances apart within the fly-wheel 10.

The outer surfaces of the segmental shoes are preferably provided with suitable non-metallic friction resisting fabric or lining as at 14 adapted to provide suitable frictional or gripping contact with the inner perimeter of the fly-wheel 10. The segmental shoes are each provided intermediate of the ends thereof with an inwardly and radially disposed boss portion 15 which is socketed to receive mechanism hereinafter to be described; the socketed bosses 15 being preferably reenforced by means of the webs 16 formed integral therewith and with the main portions of the shoe, as clearly shown in Figure 1.

Secured to the end of the driven shaft 12, by means of a key as at 17 is an annular member or disc 18, having a hub portion disposed toward one side and socketed as at 19, while the remainder of the member 18 is shown of a diameter substantially equal to the inner diameter of the fly-wheel 10; the radially disposed portion of member 18 being provided, preferably, with an annular flat surface on the outer side thereof so as to provide a circumferential braking surface as shown at 20. The socket 19 (a number of sockets equal to the number of segmental shoes 13 being provided and as they are identical but one need be described) in the hub portion of member 18 is preferably shown internally threaded at 21 to receive the threaded end of a cylindrical shell 22 which is adapted to telescope and have sliding relation with the socketed boss 15 of the segmental shoes 13; the length of bosses 15 of the shoes and the diameter of the hub portion of member 18 are such as to provide an intermediate space or gap as shown at 23 sufficient to permit movement of the segmental shoes out of braking contact with the inner circumference of the fly-wheel 10.

The inner upper end of the boss 15 of each shoe is internally threaded to receive the threaded cap portion 24 of a stem or rod member 25 which is of length greater than the length of the boss 15 of the segmental shoes to permit it to extend into the hub portion of the member 18, namely to the lower end of the socket 19, at which point the socket 19 is provided with a laterally disposed passage or orifice 26 for the passage of the mechanism hereinafter to be described. It will be understood that the hub of member 18 is provided with a number of similar sockets, equal to the number of shoes employed. The lower end of the stem or rod 25 has a pin or short rod 27 pivotally secured thereto at 28 and this pin 27 in turn is slidably mounted in a longitudinal socket formed in a member 29, whose inner end is shown formed with oppositely disposed hub portions or bosses 30 which are apertured as shown in Figure 3 to receive the pivot pins 31 whereby the member 29 is pivotally secured in the laterally disposed portion 26 at the lower end of the socket 19 in the hub portion of member 18. The pivot points 31 are arranged eccentric to the pivot 28; that is to say, at a slight distance removed from the pivot pin 28, as shown in Figure 3, where the member 27 is disposed between the bifurcated end or ears 32 of member 25. The pivot pins 31 constitute the fulcrum points for the composite mechanism comprising the member 29 with its slidably held member 27 which is pivotally secured to the lower end of the stem 25 of member 24, so that any oscillation of member 29 about pivot points 31 will cause either in or outward movement of the member 24 and therefore of the attached shoe 13.

Each socket 10 in the hub portion of member 18 is adapted to receive a suitable compression spring 33 which is disposed about the stem portion 25 with one end bearing against the shoulder in the socket 19 while the other end rests within the cupped member 24, as clearly shown in Figures 1 and 2 and normally tends to force the segmental shoe 13 outwardly into frictional relation with the inner circumference of the flywheel 10. The outer end of the member 29 is shown bifurcated to receive a suitable roller 34 which rotates about a pin 35; and the roller of each member 29 rides on a cone or wedging member 36 which is provided with a threaded extension 37 and is slidably mounted on the shaft 12. The desired or adjusted position of the cone 36 is maintained by a suitable washer or nut 37$^a$ on the end of extension 37 which extends through the end wall of a cup member 38. The exterior of member 38 is threaded and receives a grooved collar 39, locked in place by a nut 38$^a$; while the closed end of member 38 is shown provided with a hardened plate adapted in conjunction with the cone 36 to receive ball-bearings as at 36$^a$ and thus provide thrust bearing for the cone 36. The grooved collar 39 is adapted to receive the inwardly disposed portions 40 of a yoke member or arms 41 secured to a transversely disposed rod or rock-shaft 42 which is intended to be oscillated by means of a suitable foot-pedal; the rock-shaft 42 in turn oscillating the yoke or arms 41 whereby the cup member 38 and cone or wedging member 36 are reciprocated or shifted lengthwise of shaft 12.

It will be understood that each segmental shoe 13 is constructed as heretofore described and that the socketed boss of each shoe is provided with a member 24 having the stem portion 25 whose lower end is pivotally secured to the pin 27 which is slidably mounted in the member 29, so that in the construction illustrated, three sets of rollers 34 will be disposed in bearing relation with the cone 36 at equal distances circumferentially thereabout, in order that all of the shoes may be simultaneously actuated or controlled when the rock-shaft 42 is oscillated and cone 36 thereby reciprocated lengthwise of shaft 12. With this construction it is apparent that when the cup 38 with the cone 36 is shifted lengthwise of shaft 12 toward the hub of member 18, that all of the members 29 will be caused to oscillate about the pivot points 31 in an outward radial direction which will induce the pins 27 to exert a downward pull on the stems 25 of members 24, namely in a direction against the action of the respective springs 33, with the result that all of the shoes 13 (by reason of the positive connection between members 24 and the shoes) will be drawn away from or out of frictional gripping relation with the inner circumference of the fly-wheel 10; in other words, the clutch mechanism will be placed in de-clutching condition. By having the cone or wedging member 26 adjustable through member or cup 38 it is also apparent that the degree of movement of the shoes 13 with each oscillation of rod or rock-shaft 42 may be regulated or controlled; that is to say, if by reason of wear or otherwise, it is desired to enable the respective springs 33 to normally be further distended, the cone member 36 may be screwed through cup member 38 in a direction away from the hub portion of member 18 so as to have the rollers 34 of the respective members 29 in contact with the smaller portion of the cone 36. Conversely stated, if it is desired to induce greater movement of the members 29, then the cone member 36 is screwed outward through cup member 38 toward the hub portion of member 18.

By pivotally securing pin or member 27 to the lower end of the stem 25, it is apparent that the elements may be more easily assembled, as the pivot connection 28 enables the pin 27 to be passed downward through the upper part of the socket 19 in the hub portion of member 18 and thence laterally through the opening 26, into which opening member 29 is also disposed and pivotally connected as previously described.

The member 18 is provided with a flat circumferential surface adjacent the perimeter thereof, which may be provided with a suitable fabric lining as at 43, of the character usually employed in brakes of motor-driven vehicles.

All of the mechanism heretofore described is adapted to be enclosed in a suitable housing or casing which is secured against rotation; one portion of the housing being shown at 44 in Figure 2 and this portion 44 of the casing or housing may also provide a suitable bearing for the operating rod or rock-shaft 42, which may be disposed transversely of the housing or casing. The portion 44 of the housing at predetermined points, is provided with inwardly or radially disposed lugs or bosses 45, shown arranged at diametrically opposite points. Each lug or boss 45 is apertured for the passage of a spindle 46 of a brake-shoe or member 47, which may be of the circular formation as shown in Figure 1, where the construction is illustrated with a pair of brake-shoes. The outer end of each spindle portion 46 is preferably provided with a tapped socket adapted to receive the threaded shank 48 of a member 49 which is shown in the nature of a circular disc. The construction shown enables each member 49 to be independently adjusted in its relation to its respective brake-shoe or member 47 and therefore to the pressure-applying means to be described.

The rod or rock-shaft 42 at two points coincident with the mechanism just described is provided with lugs or arms 50, see Figures 1 and 4.

The lugs or arms 50 are preferably arranged in pairs, with the outer ends of the lugs or arms of each pair provided with a transversely disposed pin 51 which passes through a suitable slot 52 formed in a link 53, see Figure 4. The opposite ends of the links 53 are pivotally secured by means of pin 54 to the lugs or bosses 45 of the housing 44 (a portion of which is shown in the drawings) and one side of each link 53, at a point radiating from the pivotal points 54 is provided with an enlargement or cam surface as at 55 which is adapted to contract with the adjustable head or member 49 of the adjacently placed brake-shoe.

The slot 52 in each link 53 is elongated and so disposed throughout the major portion of its length that the pin 51 of the arm 50 may move through the arc of a circle lengthwise of the slot without imparting oscillatory movement to the link 53 until the pin 51 reaches the upper end of the slot 52 where said slot is curved outwardly or disposed slightly toward one side of the longitudinal axis thereof, at which point the pin 51 will cause the arm 53 to be oscillated about the pin 54 and force the projection or cam surface 55 into pressing relation with the adjustable member 49 and thereby cause the brake-shoe 47 to be moved into brake-applying relation with the lined surface 43 of the member 18 so as to hold the latter, and therefore also shaft 12, against rotation.

With the construction shown and described, it is apparent that oscillation of rock-shaft 42 in one direction, to-wit counterclockwise direction in the construction as illustrated in the drawings will induce the wedging member 36 to be shifted lengthwise of shaft 12 sufficiently to cause members 29 to oscillate about their respective pivot points 31 and thereby retract the segmental shoes 13, against the action of the springs 33, out of clutching position; while a still further oscillation of the rock-shaft 42 will bring the pins 51 of arms 50 into the upper offset ends of the slots 52 in links 53, causing the latter to be oscillated so as to force the eccentric or cam portions 55 into pressing engagement with the adjustable heads or members 49, thereby inducing inward movement of the brake-shoes against the rotating member 18 and provide braking relation therewith during the nonclutching phase of the clutch mechanism, so that shaft 12 will be held against rotation regardless of rotation of the flywheel 10.

With this construction, it is apparent that a single foot pedal, operatively connected with the rock-shaft or rod 42, may be employed for controlling the clutch as well as the application of a service brake to the transmission shaft of the vehicle. The construction and arrangement of the various elements as heretofore described permit of adjustments being made in both the clutch portion of the mechanism and the brake portion of the mechanism, to compensate for any wear and also for the purpose of controlling the degree of pressure or power application desired in the actuation of the respective elements; and the construction shown and described is believed to be the simplest embodiment of my invention which has been described in terms and expressions which are merely used as terms of description and not of limitation, as there is no intention in the use of such terms and expressions to exclude any mechanical equivalents for the respective features shown and described, as certain structural modifications are possible and may be made without, however, departing from the spirit of my invention.

What I claim is:—

1. Mechanism of the character described, comprising, in combination with a fly-wheel, a plurality of segmental members adapted to have bearing relation with the inner circumference of the fly-wheel, a driven member arranged concentric with the fly-wheel and said segmental members, spring-controlled means fulcrumed intermediate of the ends thereof on said driven member and operatively connected with said segmental members and normally tending to force the latter into clutching relation with the fly-wheel, and means adapted to have operative engagement with the free ends of said first means whereby said spring-controlled means may be actuated and said segmental members thereby retracted from operative relation with the inner circumference of the fly-wheel.

2. Mechanism of the character described, comprising, in combination with a fly-wheel, means arranged within the fly-wheel and adapted to move radially into and out of bearing relation with the inner circumference thereof, a driven member arranged concentric with the fly-wheel and said means, spring-controlled means pivotally mounted intermediate of the ends on said driven member and having adjustable relation with said first mentioned means, and slidably mounted means whereby said spring-controlled means may be actuated and the relation of the first mentioned means to the inner circumference of the fly-wheel thereby affected.

3. Mechanism of the character described, comprising, in combination with a power-imparting member, concentric means adapted to effect operative relation with the power-imparting member and provided with radially disposed sockets, a driven member arranged concentric with the power-imparting member and said means and provided with socketed hub portions, spring controlled means pivotally carried by the driven member and disposed through said sockets and socketed hub portions, said last means being operatively connected with the first mentioned means, and means whereby said last mentioned means may be actuated and the relation between the first mentioned means and the power-imparting member controlled.

4. Mechanism of the character described, comprising, in combination with a power-imparting member, means adapted to effect operative relation with the power-imparting member, a driven member arranged concentric with the power-imparting member and said means, radially disposed spring-controlled means pivotally mounted on said driven member, having adjustable operative relation with said first means and normally tending to force the first means into operative relation with the power-imparting member, and slidably mounted means arranged in operative relation with the free ends of said spring-controlled means whereby said spring-controlled means is caused to move radially against the action of its springs and the relation of the first mentioned means to the power-imparting member controlled.

5. Mechanism of the character described, comprising, in combination with a fly-wheel a driven member arranged concentric with the fly-wheel, a plurality of segmental members intermediate of the driven member and the inner periphery of the fly-wheel and adapted to have bearing relation with the inner periphery of said fly-wheel, composite mechanism pivoted at an intermediate point on the driven member and adjustably connected with the segmental members, compression springs disposed about said composite mechanism intermediate of the driven member and said segmental members whereby the latter are normally held in bearing relation with the inner perimeter of the fly-wheel, and slidably mounted means adapted to have wedging relation with the free ends of the composite mechanism so as to cause reciprocatory movement of a portion of the composite mechanism against the action of said springs and the segmental members thereby moved out of bearing relation with the fly-wheel.

6. Mechanism of the character described, comprising, in combination with a fly-wheel, a driven member arranged concentrically with the fly-wheel, a plurality of segmental members disposed intermediate of the driven member and the inner perimeter of the fly-wheel and adapted to have bearing relation with the fly-wheel, mechanism adjustably connected with the segmental members and carried by said driven member, springs whereby said mechanism and the segmental members are forced radially outward so as to maintain the segmental members in binding frictional relation with the inner perimeter of the fly-wheel, means pivotally mounted in the driven member and having yielding relation with said mechanism whereby the latter may be moved against the action of said springs and the segmental members withdrawn from bearing relation with the fly-wheel, and means whereby the last mentioned means may be actuated.

7. Mechanism of the character described, comprising, in combination with a fly-wheel, a driven member arranged concentrically with the fly-wheel and provided with radially disposed sockets, a plurality of segmental members disposed intermediate of the driven member and the inner perimeter of the fly-wheel and adapted to have bearing relation with the fly-wheel, yielding means seated in the sockets of the driven member and operatively connected with the segmental members and normally forcing the latter into bearing relation with the fly-wheel, means fulcrumed in the driven member and operatively connected with the yielding means for controlling the relation of the segmental members with the fly-wheel, and wedging means for actuating said last mentioned means.

8. Mechanism of the character described, comprising, in combination with a fly-wheel, a driven member arranged concentric with the fly-wheel and provided with radially disposed sockets, a plurality of segmental members arranged intermediate of the driven member and the inner perimeter of the fly-wheel and adapted to have bearing relation with the latter, spring-controlled toggle means arranged in the sockets of the driven member and having operative relation with the segmental members, means pivotally mounted in the driven member and arranged in yielding operative relation with the toggle means for moving the latter against the action of its springs, and means whereby said last mentioned means may be actuated.

9. Mechanism of the character described, comprising, in combination with a fly-wheel, a driven member arranged concentric with the fly-wheel and provided with a radially disposed annular surface, a plurality of segmental members disposed intermediate of the hub portion of the driven member and said fly-wheel and adapted to have bearing relation with the inner perimeter of the latter, spring-controlled means fulcrumed in the hub of the driven member and operatively connected with the segmental members whereby the disposition of the latter relative to the fly-wheel may be controlled, means adapted to have bearing relation with the radially disposed annular surface of the driven member, and a rock-shaft common to the spring-controlled means and said last mentioned means whereby the spring-controlled means will be actuated at a predetermined moment in advance of the actuation of the last mentioned means when said rock-shaft is oscillated in one direction.

10. Mechanism of the character described, comprising, in combination with a fly-wheel a driven member arranged concentric with the fly-wheel and provided with an annular flange, a plurality of segmental members disposed intermediate of the hub of the driven member and the inner perimeter of the fly-wheel and adapted to have bearing relation with the latter, spring-controlled means pivotally secured to the hub of the driven member and operatively connected with the segmental members whereby the latter are normally held in bearing relation with the inner perimeter of the fly-wheel, spring-controlled means adapted to engage with the annular flange of the driven member, and a single rock-shaft common to both mentioned spring-controlled means whereby the first mentioned spring-controlled means will be actuated in advance of the actuation of the second mentioned spring-controlled means when said rock-shaft is oscillated in one direction, whereby the segmental members will be withdrawn from bearing relation with the fly-wheel in advance of the movement of the second mentioned spring-controlled means into bearing relation with the annular flange of the driven member.

11. Mechanism of the character described, comprising, in combination with a power-imparting member, a driven member arranged concentric with the power-imparting member and provided with an annular bearing surface, a plurality of segmental members disposed intermediate of the hub of the driven member and the power-imparting member and adapted to have operative relation with the latter, means adjustably connected with the segmental members and pivotally mounted in the hub of the driven member, said means being under spring pressure so as to normally force the segmental members into bearing relation with the power-imparting member, means for moving the last mentioned means about the pivotal points thereof against said spring pressure, slidably mounted means movable transversely into bearing relation with the annular bearing surface of the driven member, toggle mechanism for controlling the last mentioned slidable means, and a single rock-shaft common to the second mentioned means and said toggle mechanism whereby oscillation of the rock-shaft in one direction will actuate the second mentioned means in advance of its actuation of the toggle mechanism whereby the driven member will be de-clutched from the power-imparting member and braking condition for the driven member provided.

12. Mechanism of the character described, comprising, in combination with a power-imparting member, a driven member concentrically arranged within the power-imparting member and provided with an annular bearing surface on one side thereof, a plurality of segmental members disposed intermediate of the hub portion of the driven member and the inner perimeter of the power-imparting member, spring-controlled means adjustably secured to the segmental members and carried by the hub of the driven member, means fulcrumed in the hub of the driven member and slidably connected with the spring-controlled means whereby the latter may be actuated against the action of its spring and the segmental members thereby withdrawn from clutching relation with the inner perimeter of the power-imparting member, a wedging member movable in a direction lengthwise of the axis of the driven member and arranged to move the last mentioned means about the fulcrumed points, slidably mounted means movable in a direction transversely of the driven member and adapted to have frictional relation with the annular bearing surface on the side of the driven member, said slidably mounted means being normally out of bearing relation with said annular bearing surface, cam mechanism adapted to actuate the last mentioned slidably mounted means to force the latter into frictional relation with the annular bearing surface of the driven member, and a single rock-shaft common to said wedging member and said cam mechanism whereby the wedging member is actuated momentarily in advance of the actuation of the cam mechanism when said rock-shaft is oscillated in one direction, the driven member thereby de-clutched from the power-imparting member and brake application to the second member induced.

13. Mechanism of the character described, comprising, in combination with a fly-wheel, a driven member mounted concentrically within said fly-wheel, radially expansible means carried by said driven member and adapted to effect operative relation with the fly-wheel whereby the driven member is caused to rotate with the fly-wheel, means fulcrumed on said driven member and operatively connected with said first means whereby the latter may be contracted out of operative relation with the fly-wheel, means adapted to engage with said driven member to hold the same against rotation, a single operating member common to said second mentioned means and said last mentioned means whereby the second mentioned means will be actuated in advance of the actuation of the last means when said single member is moved in one direction and vice versa when moved in the opposite direction.

14. Mechanism of the character described, comprising, in combination with a fly-wheel, a driven member mounted concentrically within said fly-wheel, radially expansible means carried by said driven member and adapted to effect operative relation with the fly-wheel whereby the driven member is caused to rotate with the fly-wheel, means fulcrumed on said driven member and operatively connected with said first means whereby the latter may be contracted out of the operative relation with the fly-wheel, and means whereby the last means may be oscillated about the fulcrum points to control said radially expansible means.

15. Mechanism of the character described, comprising, in combination with a fly-wheel, a driven member mounted concentrically with said fly-wheel, radially expansible means carried by said driven member at predetermined points about its axis and adapted to effect operative relation with the inner perimeter of the fly-wheel whereby the driven member is caused to rotate with the fly-wheel, means fulcrumed at predetermined points on said driven member and operatively connected with the first means whereby the latter may be contracted out of operative relation with the fly-wheel, a rock-shaft, and means intermediate of the rock-shaft and said fulcrumed means whereby the latter will be moved about the fulcrum points thereof when said rock-shaft is oscillated.

16. Mechanism of the character described, comprising, in combination with a fly-wheel, a driven member mounted concentrically with said fly-wheel, a plurality of members disposed intermediate of the drive member and the inner perimeter of the fly-wheel and adapted to engage with the latter, means whereby said plurality of members will be held in their circumferential spaced relation and the rotative movement of said members transmitted to the driven member, radially expansible means pivotally secured to the driven member and operatively connected with said plurality of members whereby the relation of the latter to the inner perimeter of the fly-wheel is controlled, means fulcrumed on said driven member and having yielding operative relation with said expansible means, and means whereby the fulcrumed means may be oscillated and the expansible means thereby contracted so as to move the plurality of members out of engagement with the fly-wheel.

17. Mechanism of the character described, comprising, in combination with a fly-wheel, a driven member mounted concentrically within the fly-wheel, a plurality of members disposed intermediate of the driven member and the fly-wheel and adapted to engage with the inner perimeter of the latter, the driven member and said plurality of members being provided with telescopically arranged socketed portions whereby the relation of said members is maintained and the rotative movement of the plurality of members with the fly-wheel transmitted to said driven member, radially expansible means disposed in the socketed portions of said members and normally tending to maintain said plurality of members in operative relation with the inner perimeter of the fly-wheel, means fulcrumed in the socketed portions of the driven member and operatively connected with said plurality of members whereby the latter may be moved against the action of said expansible means, and means adapted to shift in a direction lengthwise of the axis of the driven member whereby said last mentioned means may be oscillated and the plurality of members moved out of operative relation with the inner perimeter of the fly-wheel.

18. Mechanism of the character described, comprising, in combination with a fly-wheel, a driven member mounted concentrically within said fly-wheel, a plurality of members disposed between the driven member and the inner perimeter of the fly-wheel and adapted to have engagement with the latter, the plurality of members and the driven member being provided with hollow telescopic portions adapted to permit movement of the plurality of members toward the driven member, toggle means fulcrumed on the driven member with one portion thereof disposed through the telescopic portions and operatively connected with said plurality of members, coil-springs arranged in said telescopic portions and normally tending to force the plurality of members into engagement with the inner perimeter of the fly-wheel, and means slidable in a direction lengthwise of the axis of the driven member whereby said toggle means will be actuated and said plurality of members moved against the action of said springs.

19. Mechanism of the character described, comprising, in combination with a fly-wheel, a driven member mounted concentrically within said fly-wheel and provided with a plurality of radially disposed sockets, a plurality of segmental members disposed intermediate of the driven member and the inner perimeter of the fly-wheel and adapted to have engagement with the inner perimeter of the fly-wheel, said segmental members being provided with radially disposed socketed portions, means removably secured in the sockets of the driven member and adapted to telescope with the socketed portions of the segmental members whereby rotative movement of the segmental members with the fly-wheel will be transmitted to the driven member, toggle mechanism fulcrumed on said driven member with a portion thereof disposed through the sockets in the driven member and through said telescopic means and having controlling relation with the segmental members, a coil-spring mounted in each socket and telescopic member and normally tending to force the segmental members into frictional relation with the inner perimeter of the fly-wheel, a cone-member slidable in a direction lengthwise of the axis of the driven member and arranged in operative relation with a second portion of said toggle mechanism whereby the latter is moved about the fulcrumed points and the segmental members retracted against the action of said springs, and a rock-shaft arranged in adjustable operative relation with said cone-member.

20. Mechanism of the character described, comprising, in combination with a fly-wheel, a driven member mounted concentrically within the fly-wheel, a plurality of segmental members disposed intermediate of the driven member and the inner perimeter of the fly-wheel and adapted to frictionally engage with the latter, radially expansible means carried by said driven member adapted to control the segmental members, means fulcrumed on the driven member and disposed laterally, means movable in a direction lengthwise of the axis of the driven member adapted to control the fulcrumed means, said longitudinally movable means being adjustable in its relation to the fulcrumed means, and a rock-shaft operatively connected with said longitudinally movable means.

21. Mechanism of the character described, comprising, in combination with a power imparting pulley or wheel, a driven member mounted concentrically within said pulley or wheel and provided with radially disposed hollow portions, a wheel-engaging member disposed intermediate of the inner perimeter of the pulley or wheel and said hollow portions, spring controlled toggle mechanism arranged in said hollow portion, operatively connected with the wheel-engaging member and normally forcing said second member into engagement with the pulley or wheel, means slidably mounted on the axis of the wheel and adapted to actuate the toggle mechanism so as to retract the second mentioned member, of a slidably mounted extensible brake-shoe adapted to engage with the driven member, a pivoted cam member adapted to force said brake-shoe into braking relation with the driven member and a member common to said cam-member and slidably mounted means whereby the latter is actuated in advance of the former when said common member is moved in one direction and reversely when it is moved in the opposite direction.

22. Mechanism of the character described, comprising, in combination with a fly-wheel, a driven member, the hub portion whereof is mounted concentrically within the flywheel, fly-wheel engaging means intermediate of the inner surface of the fly-wheel and hub portion of said driven member, means, carried by the driven member, adapted to control the fly-wheel engaging means, fulcrumed means for controlling said second mentioned means, means adapted to engage with said driven member to hold the latter against rotation, a single operating nember common to said fulcrumed means and said last mentioned means whereby the fulcrumed means will be actuated in advance of the actuation of said last mentioned means when said operating member is moved in one direction.

23. Mechanism of the character described, comprising, in combination with a fly-wheel, a driven member whose hub portion is mounted concentrically within the fly-wheel, fly-wheel engaging means intermediate of the inner surface of the fly-wheel and the hub of the driven member, means carried by the driven member adapted to control the fly-wheel engaging means, means adapted to engage with said driven member to hold the latter against rotation, and operating means common to said second mentioned means and said last mentioned means whereby the second mentioned means will be actuated in advance of the actuation of the last mentioned means when said operating means is moved in one direction.

IRVIN HUPP.

Witnesses:
G. HEIDMAN.
F. A. FLORELL.